United States Patent
Katahira et al.

(10) Patent No.: US 10,046,777 B2
(45) Date of Patent: Aug. 14, 2018

(54) VEHICULAR SUSPENSION DEVICE, STEERING BOGIE, AND VEHICLE

(71) Applicant: MITSUBISHI HEAVY INDUSTRIES, LTD., Tokyo (JP)

(72) Inventors: Kousuke Katahira, Tokyo (JP); So Tamura, Tokyo (JP); Mitsuaki Hoshi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 122 days.

(21) Appl. No.: 15/039,402

(22) PCT Filed: Jul. 11, 2014

(86) PCT No.: PCT/JP2014/068576
§ 371 (c)(1),
(2) Date: May 25, 2016

(87) PCT Pub. No.: WO2015/079734
PCT Pub. Date: Jun. 4, 2015

(65) Prior Publication Data
US 2017/0158210 A1    Jun. 8, 2017

(30) Foreign Application Priority Data
Nov. 28, 2013    (JP) .................................. 2013-246036

(51) Int. Cl.
*B61F 5/10* (2006.01)
*B61F 5/52* (2006.01)

(52) U.S. Cl.
CPC . *B61F 5/52* (2013.01); *B61F 5/10* (2013.01)

(58) Field of Classification Search
CPC ...... B61F 5/50; B61F 5/52; B61F 9/00; B61C 11/24; B61C 7/00; B61B 13/00
See application file for complete search history.

(56) References Cited

U.S. PATENT DOCUMENTS

2011/0265683 A1* 11/2011 Kurahashi ............... B61B 10/04
                                                           105/215.2
2012/0031298 A1*  2/2012 Kurahashi ............... B61B 10/04
                                                           105/215.2

(Continued)

FOREIGN PATENT DOCUMENTS

JP    48-21443 B1    6/1973
JP    50-117115 A    9/1975

(Continued)

OTHER PUBLICATIONS

International Search Report in PCT Application No. PCT/JP2014/068576, dated Oct. 7, 2014.
Written Opinion in PCT Application No. PCT/JP2014/068576, dated Oct. 7, 2014.

*Primary Examiner* — Jason C Smith
(74) *Attorney, Agent, or Firm* — Kanesaka Berner and Partners LLP

(57) ABSTRACT

A vehicular suspension device has: a pair of primary support parts for respectively and elastically supporting elastic tires on a sub frame, the tires being located on both vehicle-widthwise sides; and a secondary support part for integrally and elastically supporting the pair of primary support parts and a car body via the sub frame, the secondary support part being located between the sub frame and the car body.

11 Claims, 15 Drawing Sheets

(56) References Cited

U.S. PATENT DOCUMENTS

| | | | |
|---|---|---|---|
| 2012/0097065 A1* | 4/2012 | Maeyama | B62D 1/265 |
| | | | 105/177 |
| 2015/0314796 A1* | 11/2015 | Maeyama | B61B 13/04 |
| | | | 701/19 |
| 2015/0353104 A1* | 12/2015 | Maeyama | B61B 13/00 |
| | | | 701/19 |
| 2015/0353106 A1* | 12/2015 | Maeyama | B62D 1/265 |
| | | | 74/89.14 |
| 2016/0052529 A1* | 2/2016 | Tachibana | B61B 13/00 |
| | | | 105/215.1 |
| 2016/0069033 A1* | 3/2016 | Katahira | E01H 5/092 |
| | | | 104/279 |
| 2016/0207548 A1* | 7/2016 | Katahira | B61B 13/00 |
| 2016/0251002 A1* | 9/2016 | Katahira | B61B 13/00 |
| | | | 105/182.1 |
| 2016/0257315 A1* | 9/2016 | Yanobu | B61F 5/38 |
| 2016/0264156 A1* | 9/2016 | Yanobu | B61B 13/04 |
| 2016/0272222 A1* | 9/2016 | Katahira | B61B 13/00 |
| 2016/0355059 A1* | 12/2016 | Katahira | B61F 9/00 |
| 2017/0158210 A1* | 6/2017 | Katahira | B61F 5/52 |

FOREIGN PATENT DOCUMENTS

| | | |
|---|---|---|
| JP | 60-189616 A | 9/1985 |
| JP | 62-143775 A | 6/1987 |
| JP | 64-004610 Y2 | 2/1989 |
| JP | 8-108720 A | 4/1996 |
| JP | 11-321635 A | 11/1999 |
| JP | 2007-139100 A | 6/2007 |
| JP | 2009-528208 A | 8/2009 |
| JP | 2012-101653 A | 5/2012 |
| JP | 2013-509325 A | 3/2013 |

\* cited by examiner

VEHICULAR SUSPENSION DEVICE, STEERING BOGIE, AND VEHICLE

RELATED APPLICATIONS

The present application is a National Phase of PCT/JP2014/068576, filed Jul. 11, 2014, and claims priority based on Japanese Patent Applications No. 2013-246036, filed Nov. 28, 2013.

Technical Field

The present invention relates to a vehicular suspension device, a steering bogie, and a vehicle.

Background Art

As new transportation means other than buses or railroads, track-based transportation systems that travel on a track by means of running wheels having elasticity, such as rubber tires, are known. Such track-based transportation systems are generally referred to as new transportation systems or automated people movers (APMs).

Vehicles of the track-based transportation systems have a configuration in which a pair of steering bogies are provided on the front and rear of a lower part of a car body.

Each steering bogie includes a pair of left and right running wheels, an axle that supports the running wheels, and a steering guide device that is guided by guide rails provided along a track, and the running wheels are adapted to be steered and are travel on the track by the guide wheels of the steering guide device being guided by the guide rails.

Here, a suspension device for allowing the displacement of a steering bogie in an upward-downward direction with respect to the car body and for preventing the vibration from the running wheels traveling on the track to be transmitted to the car body is provided between an underframe constituting a lower surface of the car body and a sub frame that supports the axle (for example, refer to the following PTL 1).

Specifically, as the suspension device used for the steering bogie, there is one including an air spring arranged between the underframe of the car body and a spring receptacle of the sub frame, and a parallel link mechanism connecting the underframe and the spring receptacle.

CITATION LIST

Patent Literature

[PTL 1] PCT Japanese Translation Patent Publication No. 2013-509325

SUMMARY OF INVENTION

Technical Problem

Meanwhile, in the vehicles of the above-described track-based transport system, it is necessary to support the load of the car body by means of the pair of running wheels provided in each steering bogie. Therefore, in the vehicles of the track-based transport system, in contrast to buses or the like, methods of making the tire internal pressure of the running wheels high and ensuring a load imposed to each running wheel are used.

However, if the tire internal pressure of the running wheels is made high, the difference between the spring stiffness (spring constant) of the running wheels, and the spring stiffness of the air spring become large. Additionally, if the spring stiffness of the running wheels becomes high, the frequency of the vibration input from the track to the running wheels become high, and it is difficult to absorb the vibration of such a high frequency with the air spring. As a result, there is a problem in that the vibration input to the running wheels is transmitted to the car body as floor vibration.

Meanwhile, in a case where the spring stiffness of the air spring is made small, there is a concern that shock may be generated due to contact between the underframe side and the spring receptacle side because the upward-downward displacement of the steering bogie with respect to the car body becomes large.

In addition, in the running wheels, with a relationship in which a load imposed or the like ensured as described above, it is difficult to make the tire internal pressure low, and there are also limitations on reduction of the spring stiffness.

As for the track, it is general to use concrete from a viewpoint of durability or the like. In that case, there are also limitations on management of surface smoothness.

The above-described problems become more marked as the distance in a forward-rearward direction between the axle and the center of gravity of the steering guide device becomes larger, and with an increase in the speed of the track-based transport system.

Thus, an object of the invention is to provide a vehicular suspension device, a steering bogie, and a vehicle in which floor vibration is reduced as well as in which the spring stiffness of running wheels can be maintained.

Solution to Problem

A vehicular suspension device related to a first aspect of the invention includes a pair of primary support parts that respectively and elastically support running wheels having elasticity disposed on both sides in a vehicle width direction on a frame; and a secondary support part that is disposed between the frame and a car body and integrally and elastically supports the pair of primary support parts and the car body via the frame.

According to the vehicular suspension device having such a configuration, the portions between the running wheels and the car body are elastically supported in series by a double support part of the primary support parts and the secondary support part via the frame. Accordingly, the total spring stiffness of the running wheels and the primary support parts becomes smaller than the spring stiffness of only the running wheels. Accordingly, the difference between the total spring stiffness of the running wheels and the primary support parts and the spring stiffness of secondary support part can be made small. Therefore, since the vibration input to the running wheels can be absorbed before a stage in which the vibration is input to the secondary support part and the vibration can be prevented from being transmitted to the car body as floor vibration, ride quality can be improved.

In this case, since the spring stiffness (internal pressure) of the running wheels can be maintained, loads imposed to the running wheels can be ensured. Additionally, since it is also not necessary to lower the spring stiffness of the secondary support part, contact between the car body side and the frame side can also be prevented.

Moreover, by adopting an independent type of suspension in which the running wheels disposed on both sides in the vehicle width direction are elastically supported by the primary support parts, respectively, the weight of the primary support parts can be made lower than that in a configuration (for example, an axle suspension type) in which the respective running wheels are integrally supported. Accordingly, the weight conforming irregularities of the track (road surface) can be made small, and the vibrational energy input to the running wheels can be made small. As a result, excellent ride quality can be ensured.

In addition, by adopting the independent type of suspension type, the conforming of the running wheels relating to irregularities of the track can be improved, and the contact situation between the running wheels and the track can be improved. As a result, slipping or idling of the running wheels is suppressed, so that wear of the running wheels can be suppressed and traveling can be stabilized.

In the vehicular suspension device related to a second aspect of the invention, if the spring stiffness of the running wheels in the above first aspect is defined as k1, the spring stiffness of the primary support parts is defined as k2, and the spring stiffness of the secondary support part is defined as k3, k1>k2>k3 may be satisfied.

According to this configuration, the difference in spring stiffness between the running wheels and the primary support parts can be made smaller than the difference in spring stiffness between the running wheels and the secondary support part. Thus, a high-frequency vibration input from the track to the running wheels can be effectively absorbed by the primary support parts.

In the vehicular suspension device related to a third aspect of the invention, the spring stiffness of the primary support parts in the above first or second aspect may be set to ½ or more or ⅔ or less of the spring stiffness of the running wheels.

According to this configuration, by setting the spring stiffness of the primary support parts to ½ or more of the spring stiffness of the running wheels, the difference between the spring stiffness of the primary support parts and the spring stiffness of the running wheels can be made small. Therefore, a high-frequency vibration input from the track to the running wheels can be efficiently absorbed by the primary support parts.

Meanwhile, by setting the spring stiffness of the primary support parts to ⅔ or less of the spring stiffness of the running wheels, the amount of displacement of the primary support parts can be suppressed, and the difference between the floor heights of the car body under unloaded conditions and loaded conditions of the car body can be made small.

Moreover, in the vehicular suspension device related to a fourth aspect of the invention, the primary support parts in the above first to third aspects may include a primary suspension mechanism that couples the running wheels and the frame so as to be displaceable in an upward-downward direction, and an elastic member that is arranged between the primary suspension mechanism and the frame.

In the vehicular suspension device related to a fifth aspect of the invention, the secondary support part in the above first to fourth aspects may include an air spring that is arranged between the car body and the frame, and an air supply and exhaust mechanism that performs air supply to and exhausting from the air spring and adjusts the height of the air spring in the upward-downward direction, and the air supply and exhaust mechanism may perform air supply to and exhausting from the air spring on the basis of the total displacement of the primary support parts and the secondary support part in the upward-downward direction with respect to the car body.

According to this configuration, by performing air supply to and exhausting from the air spring on the basis of the displacement of the car body in the upward-downward direction relative to the primary support parts, the total displacement of the primary support parts and the secondary support part can be adjusted via the height of the air spring. In this case, the difference between the floor heights of the car body under unloaded conditions and loaded conditions of the car body can be made small.

A steering bogie related to a sixth aspect of the invention includes the running wheels in the above first to fifth aspects; a steering guide device that is guided by a guide rail extending along a track; and the vehicular suspension device of the above invention that is disposed between the running wheels and the car body.

According to this configuration, the vehicular suspension device of the above invention is provided. Therefore, the vibration input from the running wheels can be prevented from being transmitted to the car body as floor vibration. Therefore, ride quality can be improved irrespective of the surface smoothness of the track or the distance between an axle and the center of gravity of the steering guide device.

Additionally, a vehicle related to a seventh aspect of the invention includes a car body; and the steering bogie in the above sixth aspect that is provided in a lower part of the car body.

According to this configuration, since the vibration input to the running wheels can be prevented from being transmitted to the car body as floor vibration, ride quality can be improved. Additionally, improvement in the speed of the vehicle can also be realized.

Advantageous Effects of Invention

According to the above vehicular suspension device, the above steering bogie, and the above vehicle, floor vibration can be reduced as well as the spring stiffness of the running wheels being able to be maintained. Thus, comfortable ride quality can be realized as well as loads imposed to the running wheels being able to be realized.

DESCRIPTION OF EMBODIMENTS

Figure 1:
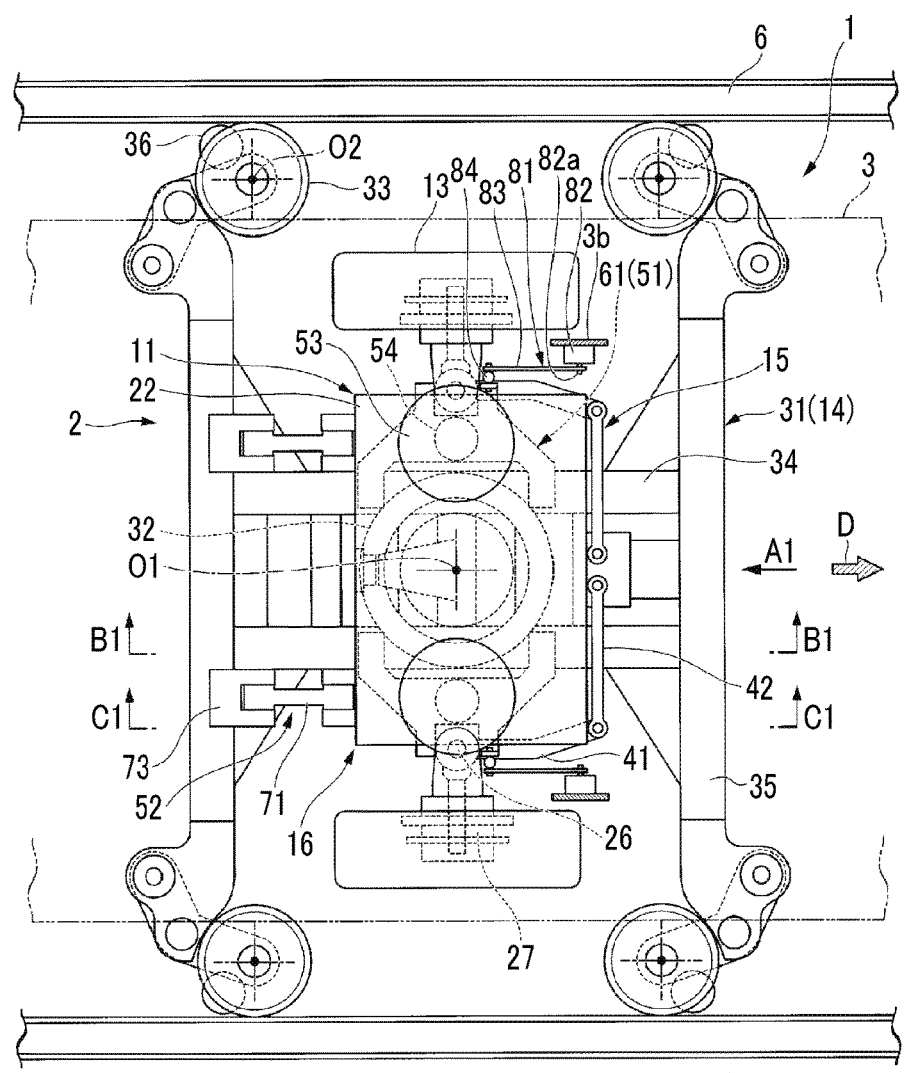
FIG. 1 is a plan view illustrating an aspect in which a vehicle in a first embodiment travels along a linear portion of a track.

Next, embodiments of the invention will be described with reference to the drawings.

[First Embodiment]

As illustrated in FIGS. 1 to 4, a vehicle 1 is a vehicle of a track-based transportation system that travels on a track 5 while being guided by guide rails 6 provided at the track 5. In the present embodiment, the vehicle 1 is a vehicle of a side guide rail type (side guide type) transportation system in which guide rails 6 extending in an extending direction of the track 5 are provided on both sides of the track 5 in a width direction.

<Vehicle>

The vehicle 1 includes steering bogies 2 that travel on the track 5, and a car body 3 (refer to FIG. 1) that is supported by the steering bogies 2.

Directions, such as the front, the rear, the top, the bottom, the left, and the right, in the following description are the same as the directions of the vehicle unless particularly mentioned. Additionally, in the following, a direction of arrow D in a forward-rearward direction of the vehicle 1 is referred to as the front, and a direction opposite to the direction of arrow D is referred to as the rear. Moreover, a direction toward a sub frame 11 (to be described below) arranged at a central part of each steering bogie 2 in a leftward-rightward direction, is referred to as an inner side, and a direction away from the sub frame 11 is referred to as an outer side.

As illustrated in FIG. 1, the car body 3 has a rectangular parallelepiped shape that is long in the forward-rearward direction, and a space capable of accommodating passengers is formed inside the car body. A pair of the above-described steering bogies 2 are provided on the front and rear of a lower part of the car body 3. In addition, since a steering bogie 2 on the front side and a steering bogie 2 on the rear side have the same configuration except that the forward and rearward directions are reversed, one steering bogie 2 (on the front side) will be representatively described below.

<Steering Bogie>

As illustrated in FIGS. 1 to 4, the steering bogie 2 includes a pair of left and right power transmission shafts 12 (refer to FIG. 2) that are rotatably supported by the sub frame (frame) 11, tires (running wheels) 13 to which rotative forces are transmitted by the respective power transmission shafts 12, a steering guide device 14 that is guided by the guide rails 6, a steering mechanism 15 (refer to FIG. 1) that steers the tires 13 according to displacement of the steering guide device 14, and a suspension device (vehicular suspension device) 16 that is arranged between an underframe 3a of the car body 3 and the tires 13.

Figure 2:
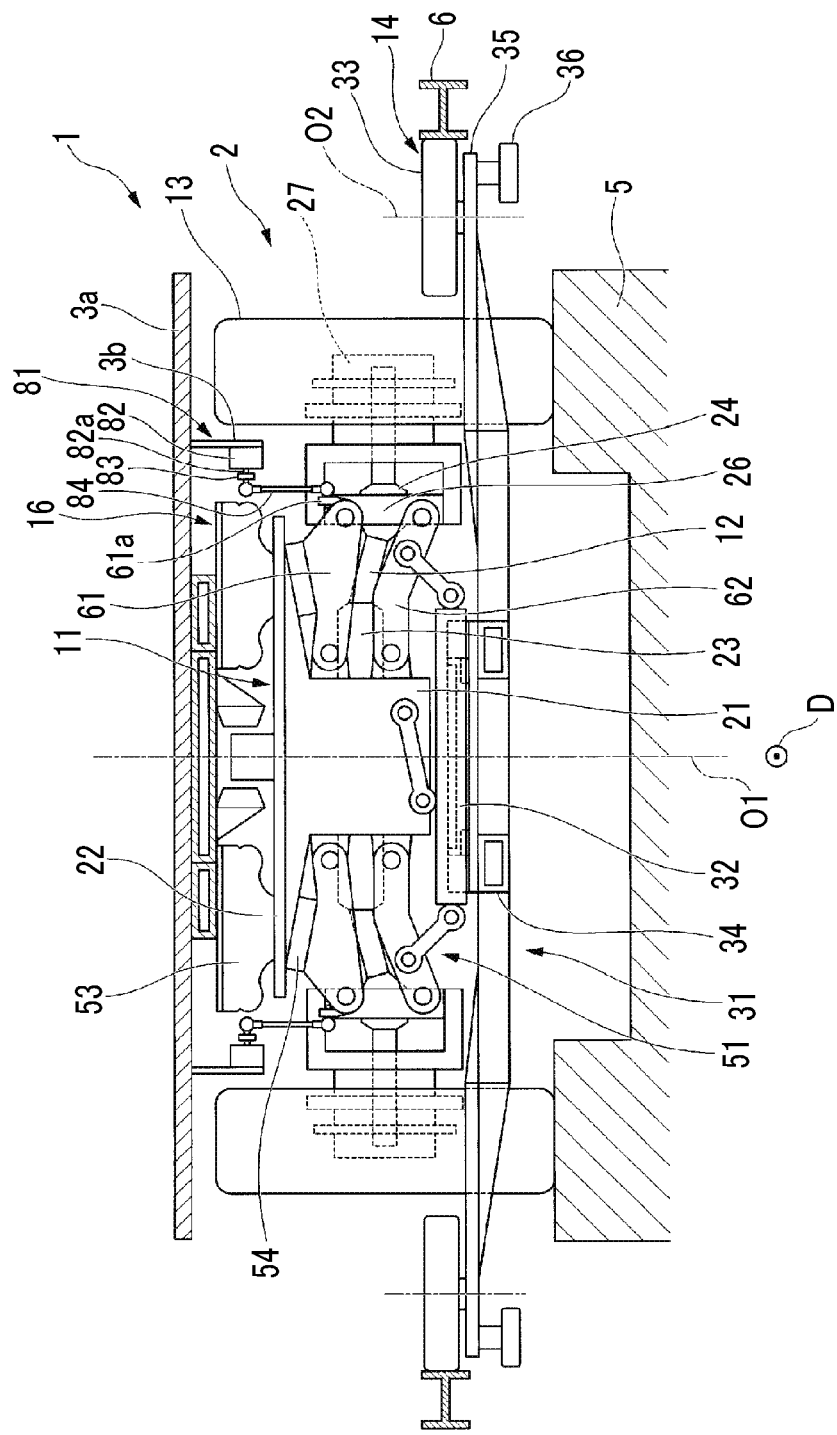
FIG. 2 is a view as seen from arrow A1 of FIG. 1.

The sub frame 11 includes a basal part 21 that is formed in a T shape in a front view as seen from the forward-rearward direction as illustrated in FIG. 2 and is located at a central part in the leftward-rightward direction (vehicle width direction), and a pair of spring receptacles 22 extending toward both sides in the leftward-rightward direction, respectively, from an upper end of the basal part 21. In addition, a gear mechanism (not illustrated), such as a speed reduction gear and a differential gear, for transmitting the rotational power from a driving source, such as a motor (not illustrated), to the power transmission shafts 12 are housed within the basal part 21.

As illustrated in FIG. 2, each power transmission shaft 12 extends in the leftward-rightward direction, and an inner end thereof in the leftward-rightward direction is coupled to the gear mechanism within the basal part 21 via a swingable joint 23. That is, the rotational power transmitted from the driving source via the gear mechanism is distributed to the power transmission shafts 12, and the power transmission shafts 12 rotate.

An outer end of each power transmission shaft 12 in the leftward-rightward direction is coupled to a tire attachment shaft 27 via a swingable joint 24. Each tire attachment shaft 27 is configured to be rockable around a kingpin 26 (refer to FIG. 1) extending in the upward-downward direction. That is, the kingpin 26 has a function as a steering shaft of a tire 13.

A tire (running wheel) 13 made of a material having elasticity, such as rubber is separately attached to each tire attachment shaft 27. As the tires 13, for example, core-type tires 13 that have a core housed therein may be used, and tires 13 with no core used for general autotrucks, general buses, or the like may be used.

In the core-type tires 13, exclusive jigs or exclusive tools are required at the time of the replacement of the tires 13, and replacement work is also difficult. Hence, since the tires 13 with no core used for general trucks or buses is used as the tires 13, it is possible to reduce costs or reduce time and effort for the replacement work of the tires.

(Steering Guide Device)

As illustrated in FIG. 1, the steering guide device includes a guide frame 31, a turning axis 32 that supports the guide frame 31 so as to be turnable around a turning axis O1 extending in the upward-downward direction, and guide wheels 33 that are rotatably supported by the guide frame 31.

The guide frame 31 is incorporated in a sharp (#) shape in a plane view as seen from the upward-downward direction, and is arranged below the sub frame 11. Specifically, the guide frame 31 includes a pair of left and right of longitudinal beams 34 extending in the forward-rearward direction, and a pair of lateral beams 35 that are coupled to both ends of the longitudinal beams 34 in the forward-rearward direction and extend in the leftward-rightward direction.

Both ends of each longitudinal beam 34 in the forward-rearward direction are located outside each tire 13, and have the lateral beams 35 coupled thereto, respectively.

Both ends of each lateral beam 35 in the leftward-rightward direction are located outside each tire 13, and are arranged so as to sandwich the tire 13 from both sides in the forward-rearward direction. The guide wheels 33 are attached to both ends of each lateral beam 35 in the leftward-rightward direction one by one.

Each guide wheel 33 is supported so as to be rotatable around a rotational axis O2 extending in the upward-downward direction, and is adapted to roll as a result of contact with each guide rail 6. In the guide frame 31, a branch inner wheel 36 is provided below the guide wheel 33, rolls in contact with the branch guide rail (not illustrated) provided at the track 5, at a branching portion in the track 5, and guides the vehicle 1 in a branch direction.

The turning axis 32 is arranged between the sub frame 11 and the guide frame 31, and is made to turn the guide frame 31 around the turning axis O1 with respect to the sub frame 11. In addition, in the illustrated example, a central part of the guide frame 31 in the forward-rearward direction and the leftward-rightward direction is located at the turning axis O1.

(Steering Mechanism)

The steering mechanism 15 changes the steering angle of the tires 13 in an interlocking manner with the turning of the guide frame 31 around the turning axis O1, and has a steering arm 41 that rocks integrally with each tire 13 (tire attachment shaft 27) on the basis of each kingpin 26, and a steering rod 42 that separately couples each steering arm 41 to the guide frame 31.

The steering rod 42 extends in the leftward-rightward direction, has an outer end pin-coupled to a front end of the steering arm 41, and has an inner end pin-coupled to the guide frame 31.

That is, if the guide frame 31 turns with the turning axis O1 as a center, the steering rod 42 is displaced with this turning, and the tire attachment shaft 27 is rotated around the kingpin 26 via the steering arm 41. Accordingly, the tires 13 is steered.

(Suspension Device)

As illustrated in FIG. 2, the suspension device 16 includes a primary suspension mechanism 51 that supports the above-described respective tires 13 so as to be displaceable independently in the upward-downward direction with respect to the sub frame 11, a second suspension mechanism 52 (refer to FIG. 3) that supports the sub frame 11 so as to be displaceable in the upward-downward direction with respect to the underframe 3a, a pair of left and right air springs 53 that are arranged between the above-described underframe 3a and the spring receptacles 22, and elastic members 54 that are arranged between the spring receptacles 22 and the primary suspension mechanism 51.

The primary suspension mechanism 51 is an independent suspension mechanism of a so-called double wishbone type, and includes a pair of left and right upper arms 61 and a pair of left and right lower arms 62 extending in the leftward-rightward direction.

Each upper arm 61 is formed in an H shape in a plan view as seen from above, and both ends thereof in the leftward-rightward direction are respectively bifurgated with respect to a central part thereof. An inner end of the upper arm 61 in the leftward-rightward direction is pin-coupled to the basal part 21 of the sub frame 11, and an outer end thereof is pin-coupled to the above-described kingpin 26. In addition, the upper arm 61 may be formed an A shape in a plan view as seen from above. In this case, an A-shaped peak portion of the upper arm 61 is pin-coupled to the kingpin 26 (outer end), and an A-shaped branching portion is pin-coupled to the basal part 21 (inner end) of the sub frame 11.

Each lower arm 62 is formed in an H shape in a plan view as seen from above, and both ends thereof in the leftward-rightward direction are respectively bifurgated with respect to a central part thereof. An inner end of the lower arm 62 in the leftward-rightward direction is pin-coupled to the basal part 21 of the sub frame 11 below the upper arm 61, and an outer end thereof is pin-coupled to the above-described kingpin 26 below the upper arm 61.

In addition, the lower arm 62 may be formed an A shape in a plan view as seen from above. In this case, an A-shaped peak portion of the lower arm 62 is pin-coupled to the kingpin 26 (outer end), and a A-shaped branching portion is pin-coupled to the basal part 21 (inner end) of the sub frame 11.

When the tires 13 are displaced in the upward-downward direction due to irregularities of the track 5, the primary suspension mechanism 51 is made rockable in the upward-downward direction with respect to the tires 13 and the sub frame 11.

Each elastic member 54 is made of rubber or the like and is separately disposed between an upper surface of each upper arm 61 and a lower surface of each spring receptacle 22. The elastic members 54 are configured so as to be elastically deformed with the displacement or the like of the primary suspension mechanism 51 and thereby absorb the vibration input to the tires 13 before a stage in which vibration is transmitted to the sub frame 11. The primary suspension mechanism 51 (the pair of upper arm 61 and lower arm 62), the pair of elastic members 54, and the spring receptacles 22 constitute a pair of primary support parts that elastically support the tires 13, respectively.

Here, if the spring stiffness of the above-described tires 13 is defined as k1 and the spring stiffness of the elastic members 54 is defined as k2, it is preferable to set the spring stiffness k2 of the elastic members 54 to ½ or more to ⅔ or less of the spring stiffness k3 of the tires 13. By setting the spring stiffness k2 of the elastic members 54 to ½ or more with respect to the spring stiffness k1 of the tires 13, the difference between the spring stiffness of the elastic members 54 and the spring stiffness k1 of the tires 13 can be made small. Therefore, a high-frequency vibration input to the tires from the track 5 can be efficiently absorbed by the elastic members 54.

Meanwhile, by setting the spring stiffness k2 of the elastic members 54 to ⅔ or less of the spring stiffness k1 of the tires 13, the amount of displacement of the elastic members 54 can be suppressed, and the difference between the floor heights of the car body 3 under unloaded conditions and loaded conditions of the car body 3 can be made small.

Figure 3:
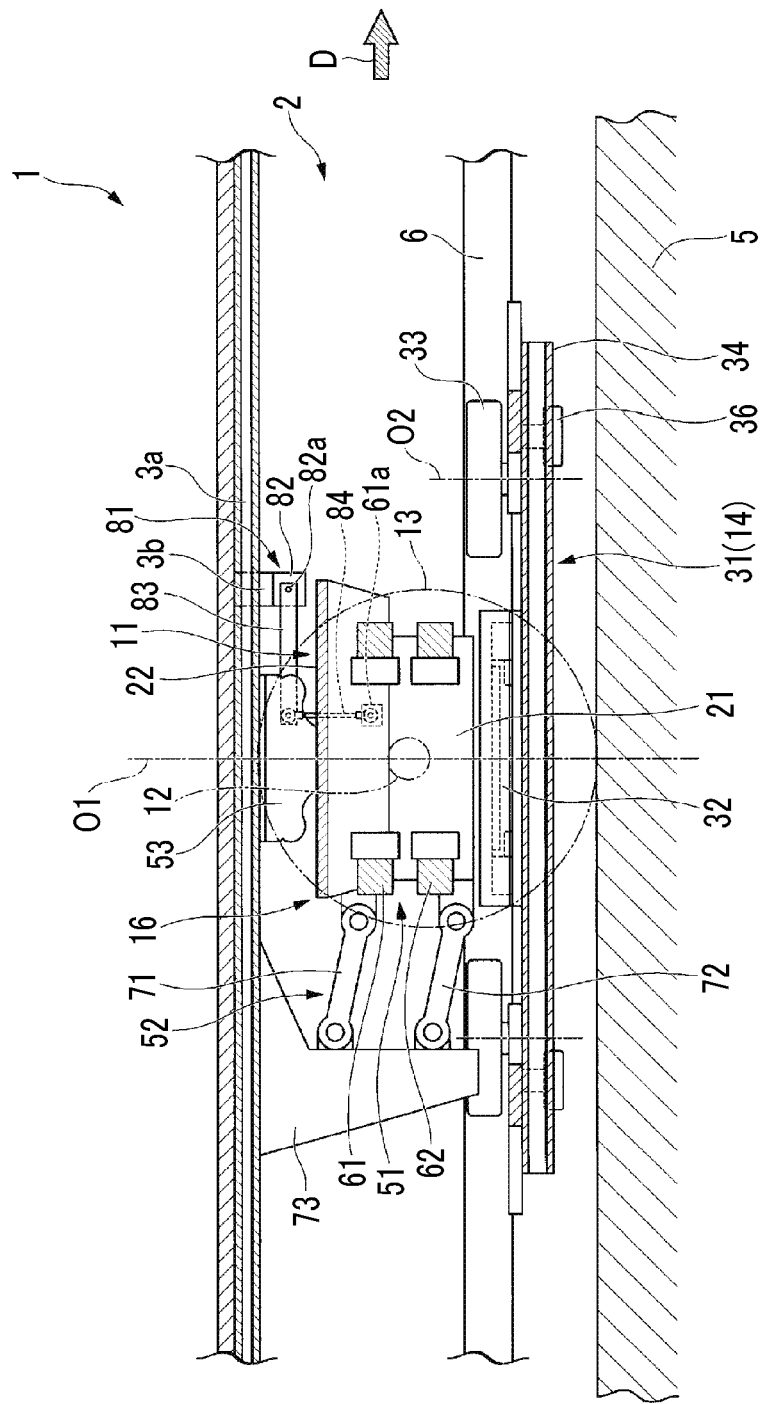
FIG. 3 is a sectional view taken along line B1-B1 of FIG. 1.
Figure 4:
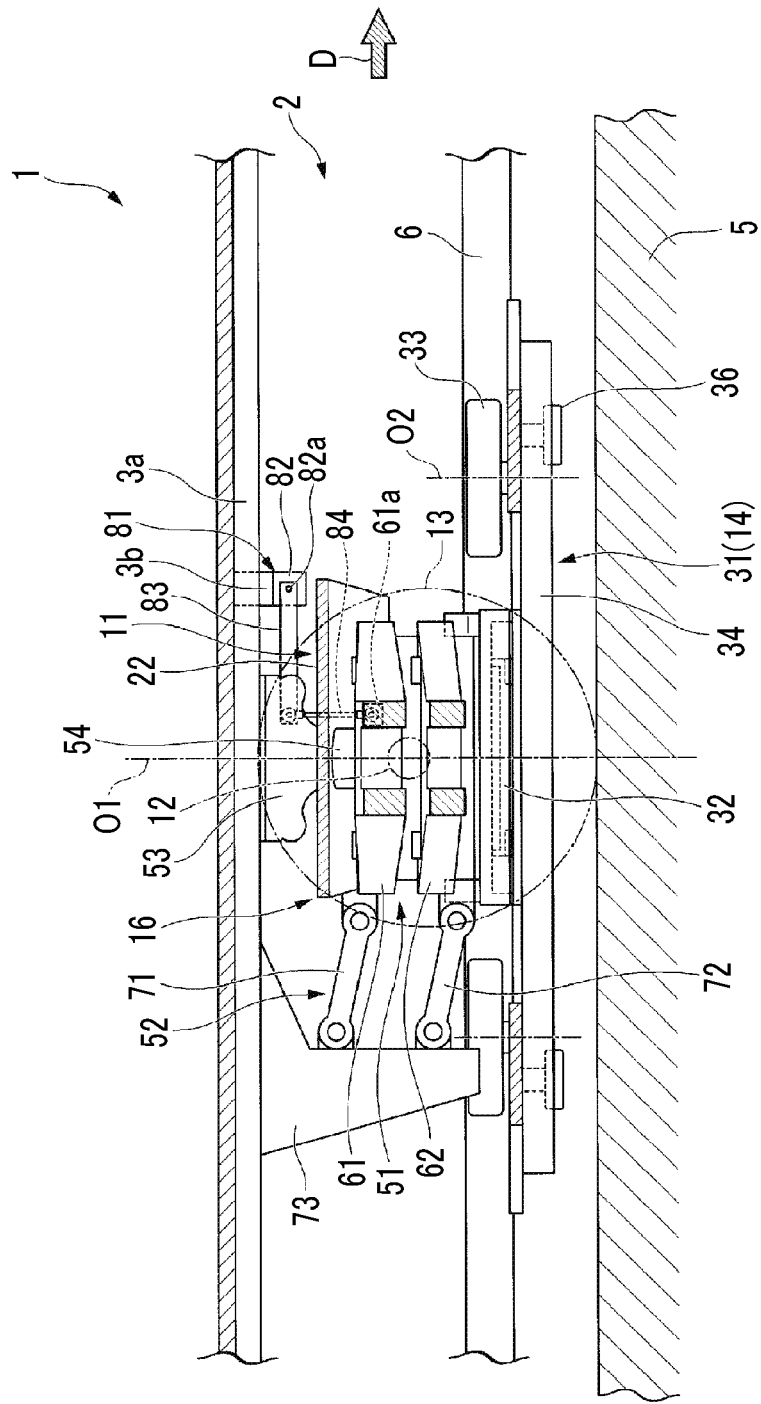
FIG. 4 is a cross-sectional view taken along line C1-C1 in FIG. 1.

As illustrated in FIGS. 3 and 4, the second suspension mechanism 52 is a so-called parallel link mechanism, and includes a pair of left and right upper links 71 and a pair of left and right lower links 72 extending parallel to each other.

Each upper link 71 and each lower link 72 extend to incline upward as they become closer to the rear, and are respectively pin-coupled to the suspension frame 73 of which a rear end extends downward from the underframe 3a. Meanwhile, front ends of the upper link 71 and the lower link 72 are pin-coupled to a rear end of the sub frame 11. The second suspension mechanism 52 is made rockable in the upward-downward direction with respect to the suspension frame 73 and the sub frame 11, according to the relative movement of the suspension frame 73 and the sub frame 11 in the upward-downward direction. In addition, the second suspension mechanism 52 also has a function as a traction rod for transmitting the driving force or braking force of the tires 13 to the car body 3.

Each air spring 53 has an upper end attached to the underframe 3a and has a lower end attached to an upper end of each spring receptacle 22. The air springs 53 relax the relative vertical vibration of the tires 13 with respect to the car body 3. In addition, if the spring stiffness of the air springs 53 is defined as k3, the relationship between the spring stiffness k1 of the above-described tires 13 and the spring stiffness k2 of the elastic members 54 is set so that the spring stiffness k3 of the air springs 53 becomes the smallest and the spring stiffness k1 of the tires 13 becomes the greatest (k1>k2>k3).

The second suspension mechanism 52, the respective air springs 53, and the spring receptacles 22 constitute a secondary support part that elastically supports the above-described pair of primary support parts and the car body 3 integrally via the sub frame 11.

Additionally, between the underframe 3a and each spring receptacle 22 is provided a height-adjusting device 81 for adjusting the distance between both in the upward-downward direction. The height-adjusting device 81 includes a height-adjusting valve 82 that is fixed to a lower part of the underframe 3*a* via a bracket 3*b*, a handle 83 that is attached to a rotating shaft 82*a* of the height-adjusting valve 82, and an adjusting rod 84 that is pin-coupled to the handle 83 and the above-described upper arm 61, respectively. A lower end of the adjusting rod 84 is coupled to the upper arm 61 via a bracket 61*a* of the upper arms 61 that is disposed in the vicinity of the tire attachment shaft 27. Additionally, as long as the lower end of the adjusting rod 84 is coupled to the primary suspension mechanism 51, it may be coupled to the lower arm 62 without being limited to the upper arm 61.

Meanwhile, if the weight of the car body 3 varies with getting on-and-off of passengers, the relative positions of the car body 3 and the upper arm 61 vary in the upward-downward direction. In the height-adjusting device 81, if the relative position of the car body 3 varies, the position of the height-adjusting valve 82 varies together with the car body 3, and the handle 83 rotates with respect to the height-adjusting valve 82 along with this, a valve built in the height-adjusting valve 82 is opened and closed, and the air from a pneumatic power source (not illustrated) is supplied to and exhausted from the air spring 53. Accordingly, by the internal pressure (spring stiffness k3) of the air springs 53 being adjusted, the height of the air springs 53 is kept constant and the floor height of the car body 3 is kept constant.

Particularly, in the present embodiment, the height-adjusting device 81 is provided between the underframe 3*a* and the upper arm 61. Therefore, the relative position of the steering bogie 2 in the upward-downward direction entire with respect to the car body 3 can be detected. That is, the total displacement of the air springs 53 and the elastic members 54 can be adjusted via the height of the air springs 53. In this case, the difference between the floor heights of the car body 3 under unloaded conditions and loaded conditions of the car body 3 can be made small.

Figure 5:
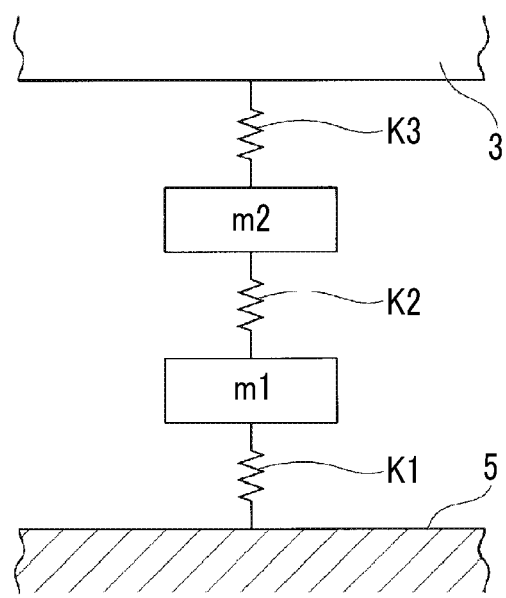
FIG. 5 is a vibration model of a steering bogie.

Here, in the steering bogie 2 of the present embodiment, portions between the tires 13 and the car body 3 are elastically supported by a double support part of the primary support parts consisting of the primary suspension mechanism 51 and the elastic members 54 and the secondary support part consisting of the second suspension mechanism 52 and the air springs 53. In this case, the steering bogie 2 of the present embodiment can be illustrated, for example, as a vibration model as illustrated in FIG. 5 if the mass of a primary spring lower member (the primary suspension mechanism 51, the tire attachment shafts 27, and the like) arranged between the tires 13 and the elastic members 54 is defined as m1, and the mass of a secondary spring lower member (the second suspension mechanism 52, the sub frame 11, and the like) arranged between the elastic members 54 and the air springs 53 is defined as m2. That is, in the steering bogie 2 of the present embodiment, a spring system consisting of the tires 13, the elastic members 54, and the air springs 53 constitutes a spring and mass system having three degrees of freedom that is connected to a mass system consisting of the primary spring lower member and the secondary spring lower member in series.

In this way, in the present embodiment, the portions between the tires 13 and the car body 3 are elastically supported in series by the double support part of the primary support parts and the secondary support part via the sub frame 11. Accordingly, the total spring stiffness of the tires 13 and the elastic members 54 becomes smaller than the spring stiffness of only the tires 13. As a result, since the difference between the total spring stiffness of the tires 13 and the elastic members 54 and the spring stiffness k3 of the air springs 53 can be made small, the vibration input to the tire 13 before a stage in which the vibration is input the air springs 53 can be absorbed, and the vibration can be prevented from being transmitted to the car body 3 as floor vibration. Hence, ride quality can be improved irrespective of the surface smoothness of the track 5 or the distance between each power transmission shaft 12 and the center of gravity of the steering guide device 14.

In this case, since the spring stiffness k1 (internal pressure) of the tires 13 can be maintained, loads imposed to the tires 13 can be ensured. Additionally, since it is not necessary to lower the spring stiffness k3 of the air springs 53, the contact between the underframe 3*a* side and the spring receptacles 22 can also be prevented.

In addition, since the spring stiffnesses k1 to k3 of the tires 13, the elastic members 54, and the air springs 53 become smaller in this order, the difference between the spring stiffnesses k1 and k2 of the tires 13 and the elastic members 54 can be made smaller than the difference between the spring stiffnesses k1 and k3 of the tires 13 and the air springs 53. Accordingly, a high-frequency vibration input from the track 5 to the tires 13 can be effectively absorbed by the elastic members 54.

Additionally, in the present embodiment, by adopting the independent type of suspension in which the pair of tires 13 disposed on both sides in the leftward-rightward direction are elastically supported by the primary suspension mechanism 51 and the elastic members 54, respectively, the weight of the primary spring lower member can be made smaller than a configuration (for example, an axle suspension type) in which the respective tires 13 are integrally supported. Accordingly, the weight conforming irregularities of the track 5 can be made small, and the vibrational energy input to the tires 13 can be made small. As a result, excellent ride quality can be ensured.

Additionally, by adopting the independent type of suspension, the conforming of the tires 13 relating to irregularities of the track 5 can be improved, and the contact situation between the tires 13 and the track 5 can be improved. As a result, slipping or idling of the tires is suppressed, so that wear of the tires 13 can be suppressed and traveling can be stabilized.

Moreover, by adopting the independent type of suspension, for example, wheel loads can be independently adjusted between the left and right tires 13 by adjusting the height of a portion (a portion where an elastic member 54 indisposed) located between each upper arm 61 and each spring receptacle 22, using a liner. Accordingly, the wheel load difference between the left and right tires 13 is easily adjusted, and variations in partial wear or durability can be made uniform between the left and right tires 13. Accordingly, the maintenance costs of the tires 13 can be reduced, maintenance work costs related to tire replacement can be reduced, and maintainability can be improved.

The present embodiment has a configuration in which the primary suspension mechanism 51 of the double wishbone type is adopted as the primary suspension mechanism 51.

According to this configuration, since two arms of the upper arm 61 and the lower arm 62 are pin-coupled to the sub frame 11 and the kingpin 26, respectively, changes in camber angle based on the displacement of each tire 13 in the upward-downward direction can be minimized. Accordingly, the situation of contact with the track 5 can be reliably improved.

In addition, since the two arms 61 and 62 are provided as described above, the smooth and stable rocking of the respective arms 61 and 62 becomes possible, and the center at the time of rolling (the rotation of the car body 3 around a longitudinal axis) is easily set.

Moreover, the present embodiment has a configuration in which the second suspension mechanism 52 that is the parallel link mechanism is adopted as the second suspension mechanism 52.

According to this configuration, since the suspension frame 73 and the sub frame 11 are combined together by the two link (the upper link 71 and the lower link 72), it is possible to adopt relatively lightweight links.

Additionally, by adjusting the lengths of the respective links 71 and 72 using a liner, adjustment of the caster angle (the inclination in the forward-rearward direction) of the kingpin 26 or adjustment of the positions of the guide wheel 33 and the steering guide device 14 in the forward-rearward and upward-downward directions also become possible.

Moreover, by arranging to incline the respective links 71 and 72 with respect to the track 5 like the present embodiment, component forces in the upward-downward direction are generated in the forces of acting on the respective links 71 and 72 due to reaction forces that act on contact portions of the tires 13 at the time of the acceleration and deceleration of the vehicle 1. The component forces act on the car body 3 as a moment in a direction reverse to an inertia moment to rotate the car body 3 around a lateral axis at the time of acceleration and deceleration (pitching displacement). For this reason, the pitching displacement at the time of acceleration and deceleration can be suppressed, and ride quality can be stabilized.

In the suspension device 16 of the present embodiment, by adopting the double suspension mechanism consisting of the primary suspension mechanism 51 and the second suspension mechanism 52, the respective characteristics of the above-described respective suspension mechanisms 51 and 52 can be mutually utilized.

Since the vehicle 1 (steering bogie 2) of the present embodiment includes the above-described suspension device 16, floor vibration can be reduced as well as the spring stiffness of the tires 13 being able to be maintained. As a result, comfortable ride quality can be realized as well as loads imposed to the tires 13 being able to be ensured. Additionally, improvement in the speed of the vehicle 1 can also be realized.

<Second Embodiment>

Next, a second embodiment of the invention will be described. The present embodiment is different from the above-described first embodiment in that a swing axle type is adopted as the primary suspension mechanism. In addition, in the following description, the same components as those of the above-described first embodiment will be designated by the same reference signs, and the description thereof will be omitted.

Figure 6:
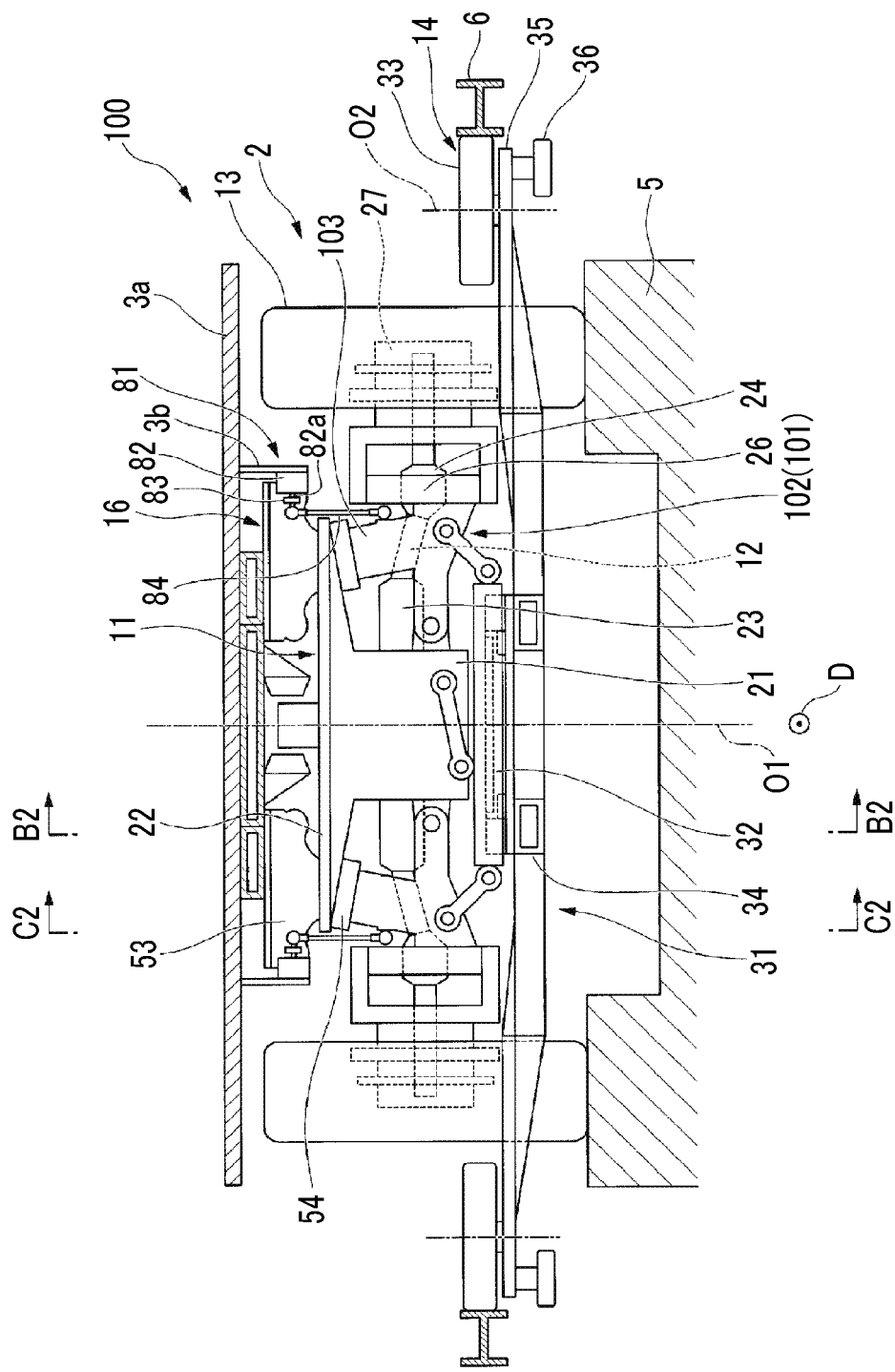
FIG. 6 is a front view equivalent to FIG. 2 in the second embodiment.
Figure 7:
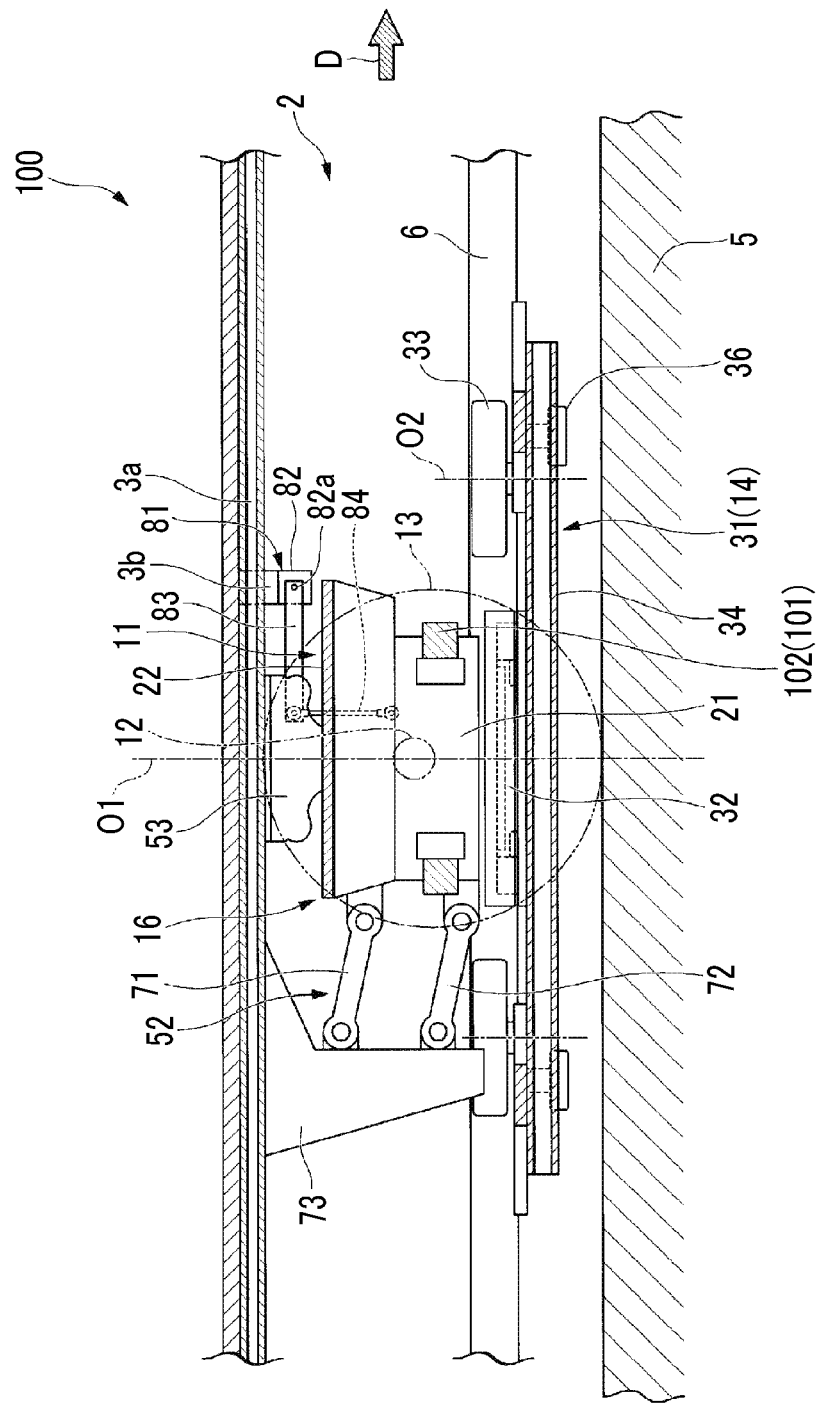
FIG. 7 is a sectional view taken along line B2-B2 of FIG. 6.
Figure 8:
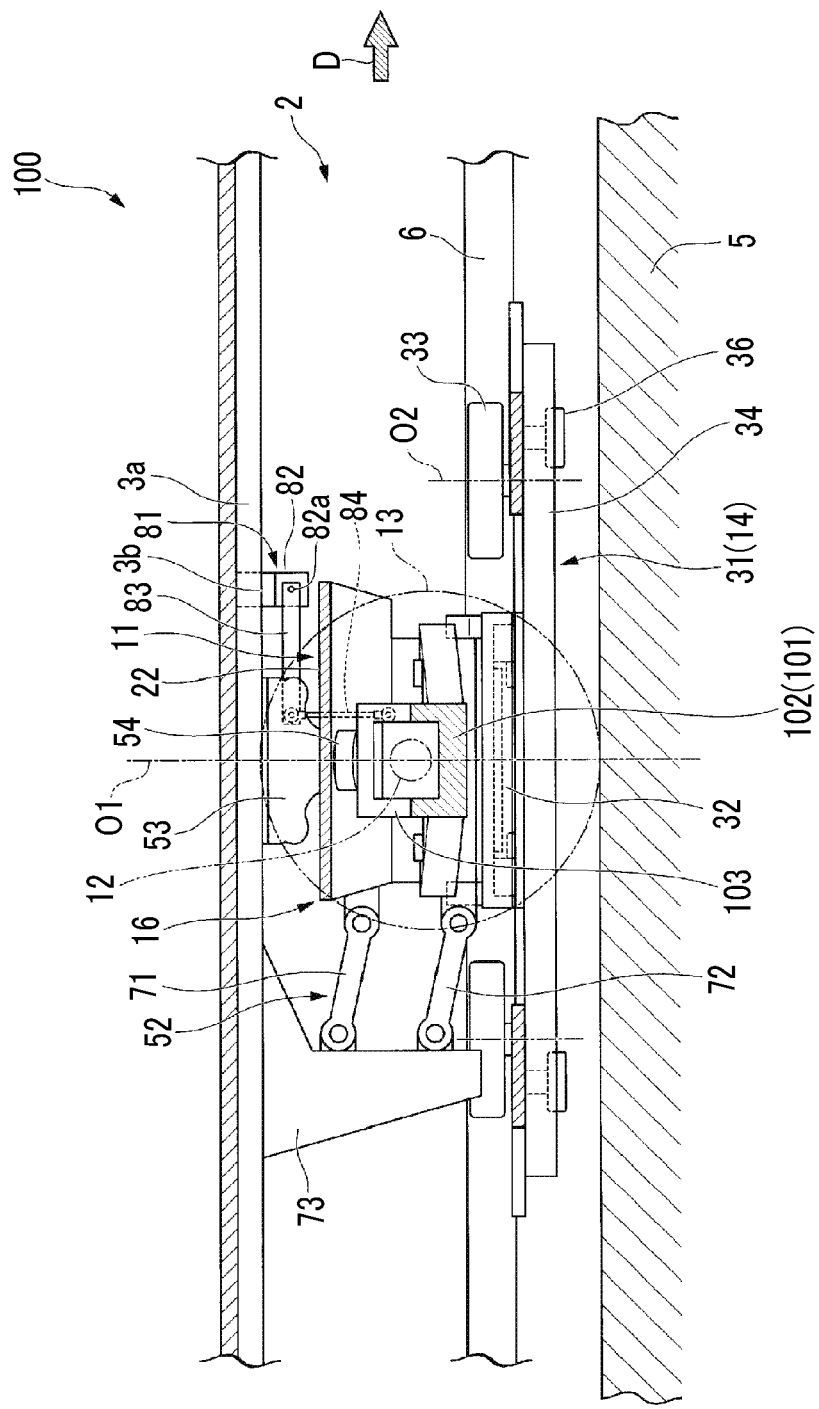
FIG. 8 is a cross-sectional view taken along line C2-C2 in FIG. 6.

As illustrated in FIGS. 6 to 8, in a vehicle 100 of the present embodiment, a primary suspension mechanism 101 includes a pair of left and right arms 102 extending in the leftward-rightward direction below the power transmission shafts 12. An inner end of each arm 102 in the leftward-rightward direction is pin-coupled to the basal part 21 of the sub frame 11, and an outer end thereof is fixed to the kingpin 26. Additionally, the arm 102 is provided with a pedestal part 103 that protrudes upward, and each elastic member 54 is disposed between an upper surface of the pedestal part 103 and a lower surface of each spring receptacle 22.

According to the present embodiment, in addition to exhibiting the same effects as those of the above-described first embodiment, by adopting the primary suspension mechanism 101 of the swing axle type, reduction of the number of parts and simplification of the configuration can be achieved compared with the primary suspension mechanism 51 (FIG. 1) of the above-described double wishbone type.

Additionally, worn-away parts are few and maintenance is easily performed, compared with the primary suspension mechanism 51 (FIG. 1) of the above-described double wishbone type.

Moreover, the space above each arm 102 can be ensured to be wide by arranging the arm 102 under the power transmission shaft 12. Accordingly, the layout performance of respective components can be improved.

<Third Embodiment>

Next, a third embodiment of the invention will be described. The present embodiment is different from the above-described first and second embodiments in that a swing arm mechanism is adopted as the second suspension mechanism. In addition, in the following description, the same components as those of the above-described first and second embodiments will be designated by the same reference signs, and the description thereof will be omitted.

Figure 9:
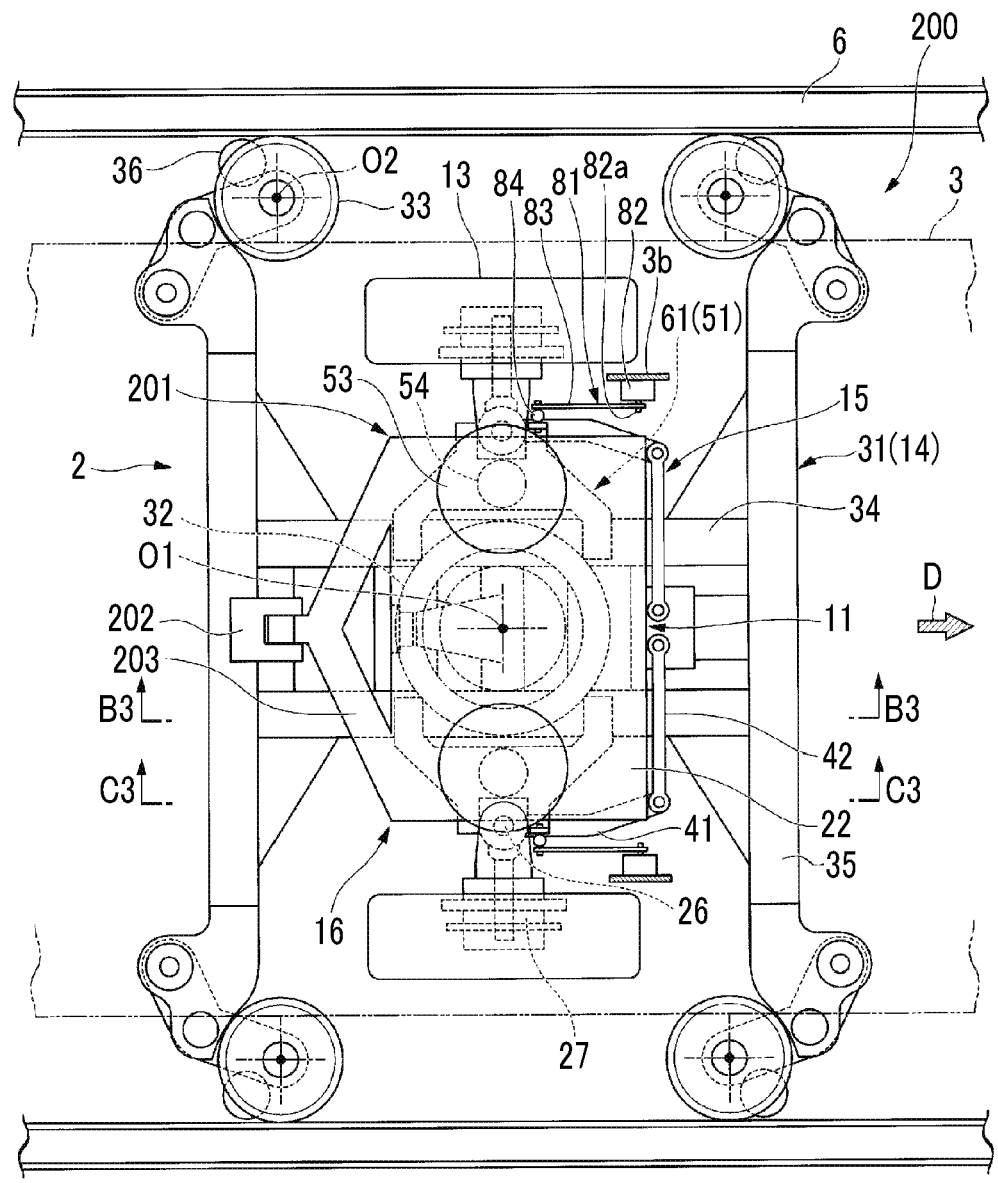
FIG. 9 is a plan view illustrating an aspect in which a vehicle in a third embodiment travels along a linear portion of a track.
Figure 10:
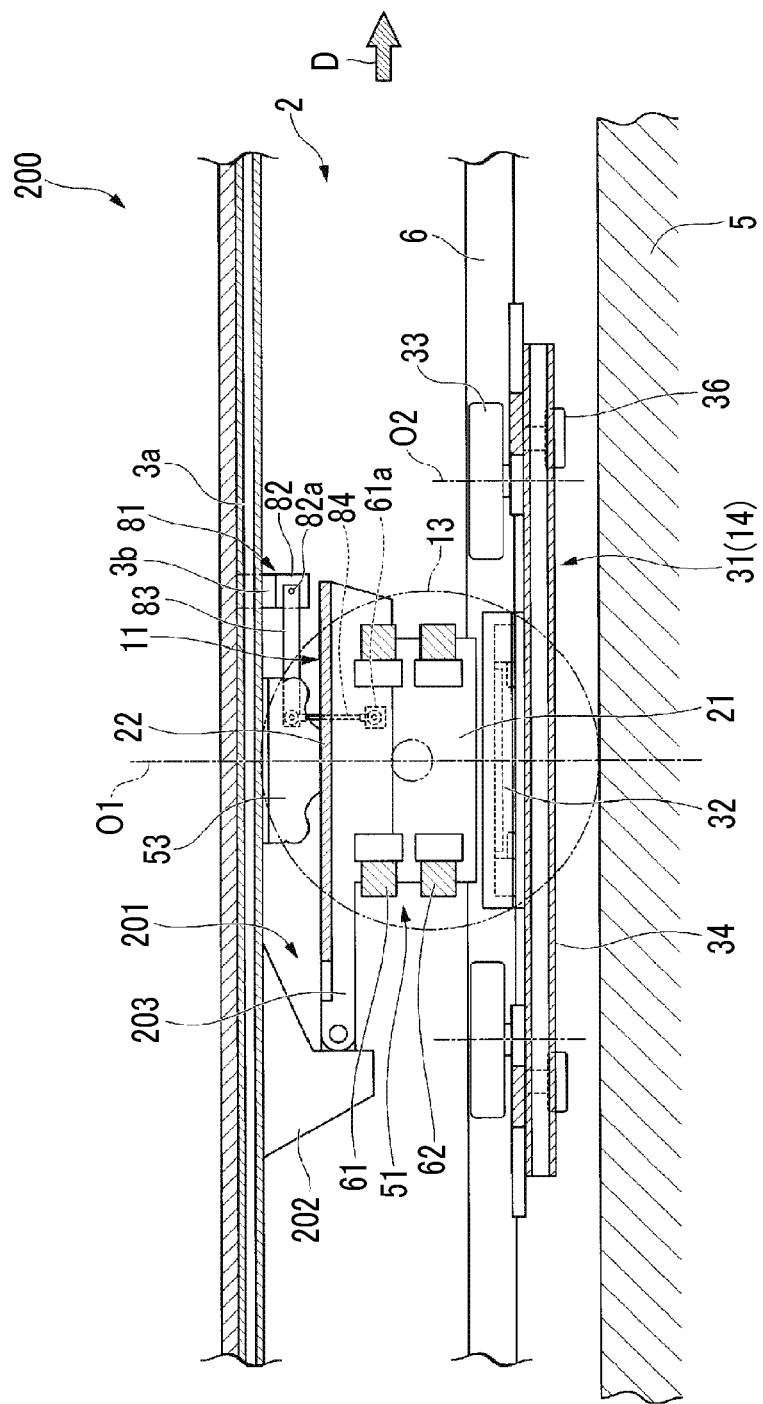
FIG. 10 is a sectional view taken along line B3-B3 of FIG. 9.
Figure 11:
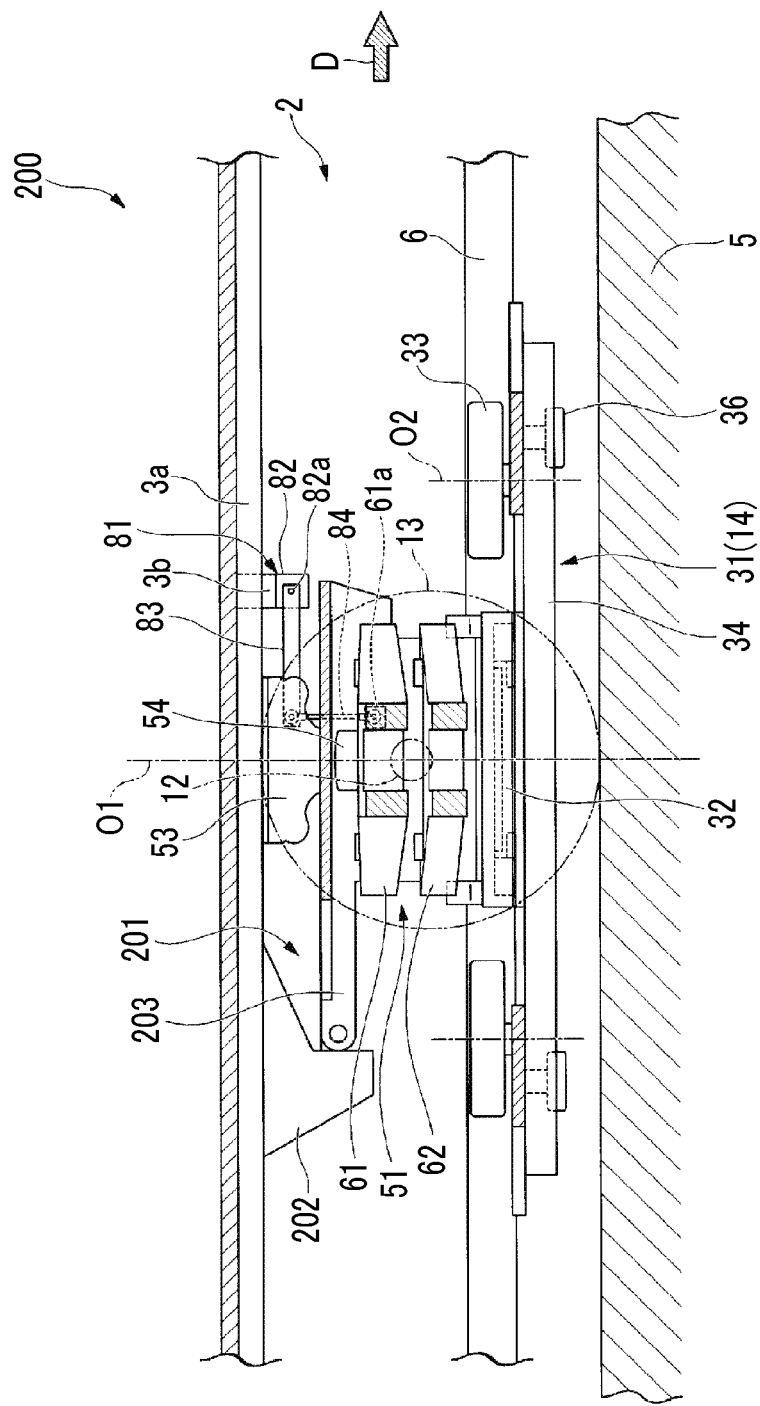
FIG. 11 is a cross-sectional view taken along line C3-C3 in FIG. 9.
Figure 12:
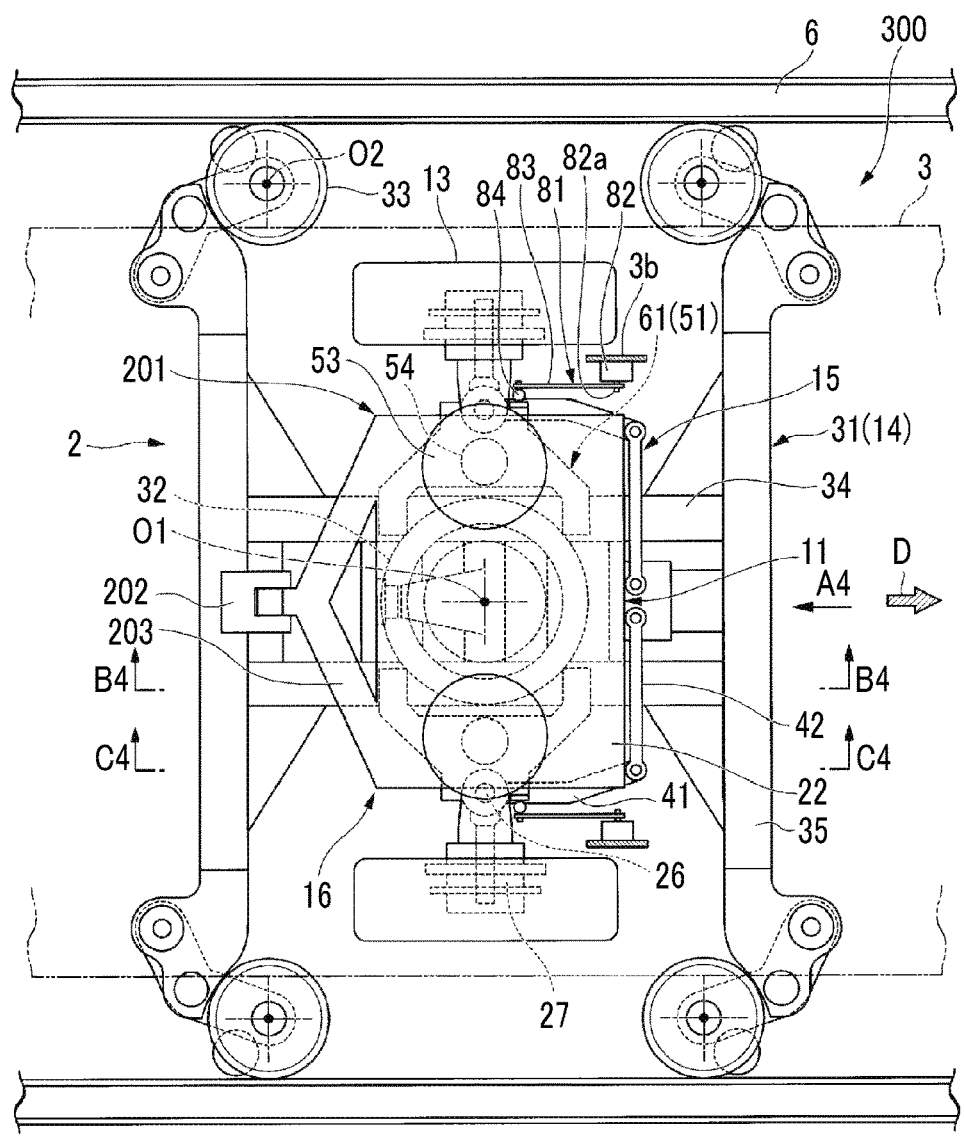
FIG. 12 is a plan view illustrating an aspect in which a vehicle in a fourth embodiment travels along a linear portion of a track.
Figure 13:
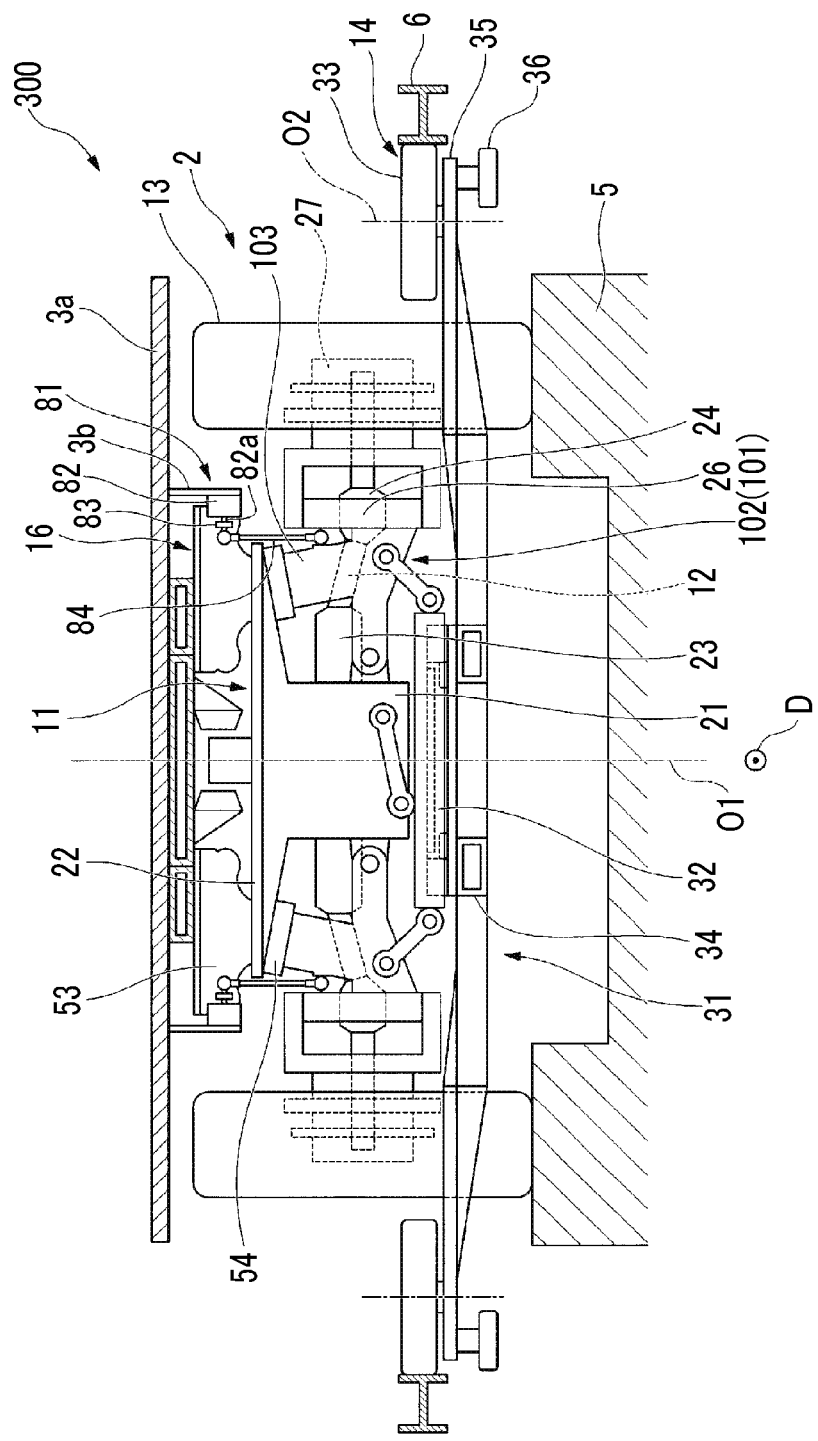
FIG. 13 is a view as seen from arrow A4 of FIG. 12.
Figure 14:
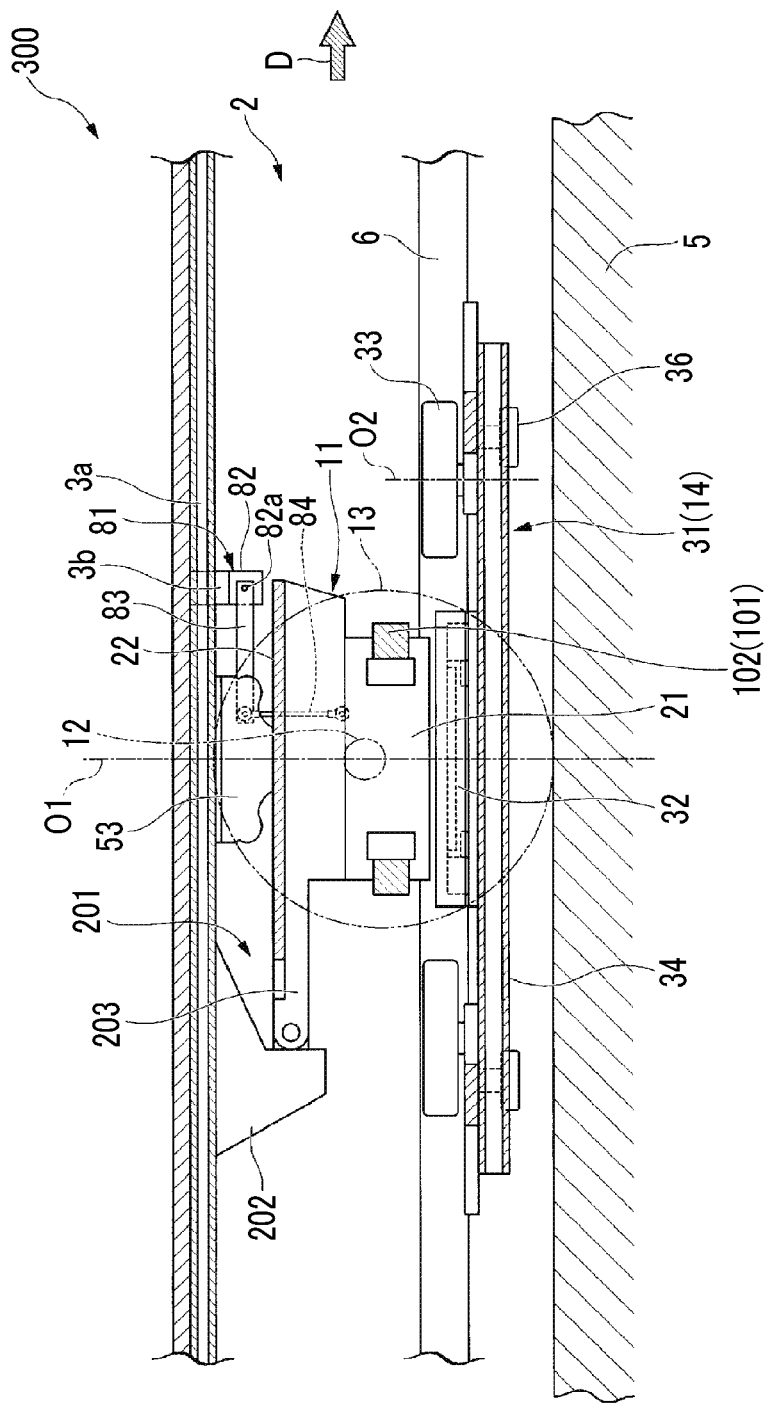
FIG. 14 is a sectional view taken along line B4-B4 of FIG. 12.
Figure 15:
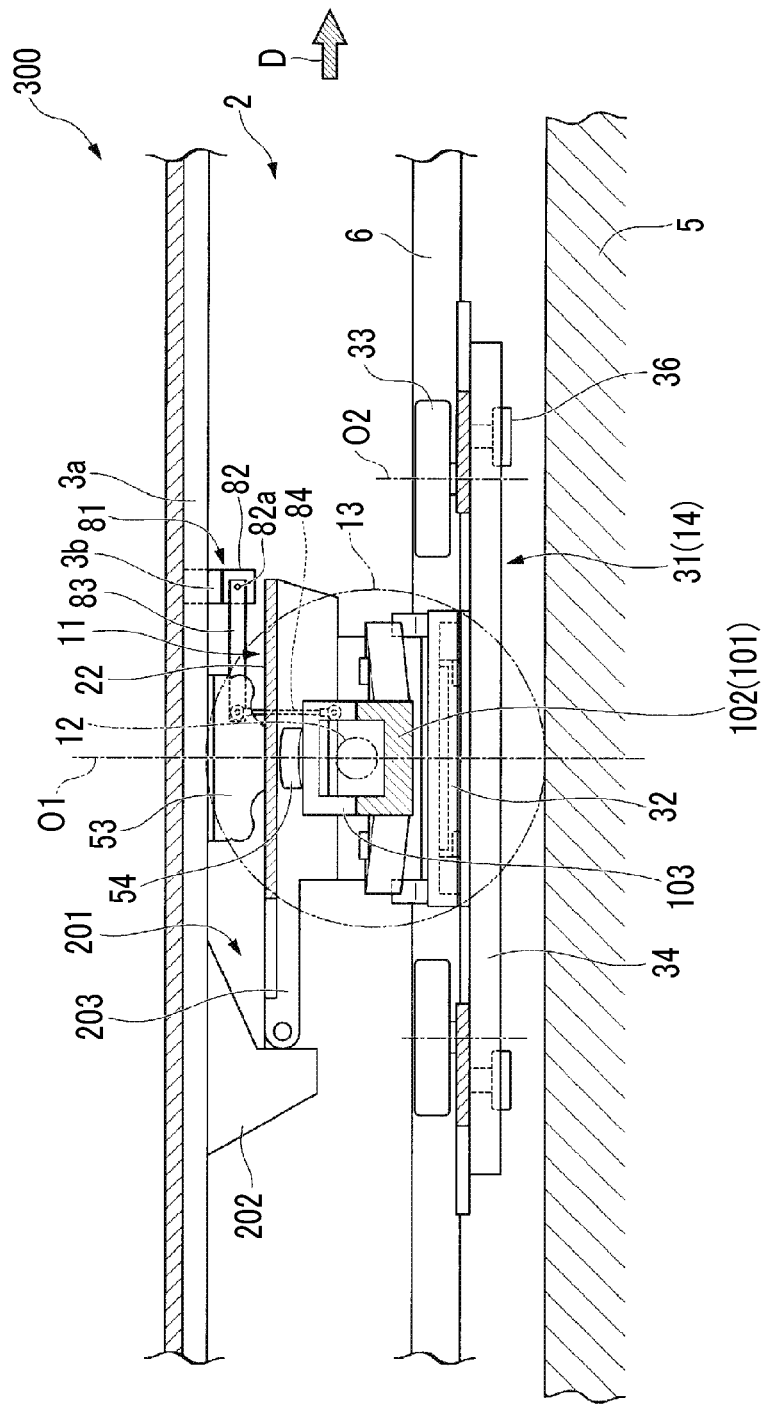
FIG. 15 is a cross-sectional view taken along line C4-C4 in FIG. 12.

As illustrated in FIGS. 9 to 11, in a vehicle 200 of the present embodiment, a second suspension mechanism 201 includes a link member 203 that couples a suspension frame 202 and the spring receptacles 22. The link member 203 assumes a V shape in a plan view as seen from the upward-downward direction, has two arms coupled together at a rear end thereof, and extends toward the outer side in the leftward-rightward direction as it becomes closer to the front side. The rear end of the link member 203 is pin-coupled to the suspension frame 202 extending downward from a central part of the underframe 3a in the leftward-rightward direction. Meanwhile, a front end of the link member 203 is integrally fixed to each spring receptacle 22.

According to this configuration, in addition to exhibiting he same effects as those of the above-described first embodiment, reduction of the number of parts, simplification of the configuration, and weight reduction can be achieved compared with toe parallel link mechanism.

By forming the link member 203 in a V-shape, the length of the link member 203 in the forward-rearward direction can be shortened as well as the length of the arms in its extending direction being able to be ensured.

Moreover, since a configuration in which the link member 203 is fixed to each spring receptacle 22 is provided, it is also possible to integrally form the link member 203 and the sub frame 11. Accordingly, further simplification and weight reduction can be achieved.

<Fourth Embodiment>

Next, a fourth embodiment of the invention will be described. As illustrated in FIGS. 12 to 15, a vehicle 300 of the present embodiment is different from the first to third above-described embodiments in that the swing axle type is adopted as the primary suspension mechanism 101 and the swing arm mechanism is adopted as the second suspension mechanism 201. In addition, since the configurations of the respective suspension mechanisms 101 and 201 are the same configuration as the above-described second and third embodiments, the description thereof will be omitted.

In addition, it should be understood that the technical scope of the invention is not limited to the above-described embodiments, but various modifications may be made to the above-described embodiments without departing from the spirit of the invention. That is, the specific structures, configurations, or the like mentioned in the embodiments are merely examples, and can be appropriately changed.

For example, a configuration using a so-called single tire in which one tire 13 as a running wheel is attached to each tire attachment shaft 27 has been described in the above-described embodiments. However, the invention is not limited to this. For example, a dual tire in which two tires 13 are attached to each tire attachment shaft 27 may be used. Additionally, three or more tires 13 may be attached to each tire attachment shaft 27.

More, in the primary suspension mechanism 51 of the double wishbone type described in the above-described first and second embodiments, the respective arms 61 and 62 may extend parallel to each other. Additionally, the spacing between the respective arms 61 and 62 in the upward-downward direction in their outer ends in the leftward-rightward direction may be set to become larger compared to that at their inner ends. In this case, the camber angle of a tire 13 located on an outer rail side at the time of rolling easily becomes a negative camber in which an upper part is tilted to the inner side in the leftward-rightward direction. Therefore, the situation of contact of the tire 13 located on the outer rail side with the track 5 can be improved, and a lateral load that causes rolling can be easily received.

Moreover, in the suspension device 16 of the above-described first and second embodiments, a configuration in which each elastic member 54 is deposed between each upper arm 61 and each spring receptacle 22 has been described. However, the invention is not limited to this.

For example, a configuration in which an elastic member is disposed between each lower arm 62 and each spring receptacle 22 may be adopted.

The elastic members are not limited to rubber, and appropriate design changes is possible, like a coil spring or the like.

In the above-described embodiments, cases where any of the double wishbone type and the swing axle type is adopted as the primary suspension mechanisms 51 and 101 and any of the parallel link mechanism and the swing arm mechanism is adopted as the second suspension mechanisms 52 and 202 have been described. However, the invention is not limited to this, and various suspension mechanisms may be adopted.

In the above-described embodiments, a configuration in which the vehicular suspension device (suspension device) of the invention is adopted for the vehicle 1 of the side guide type. However, the invention is not limited to this. For example, the vehicular suspension device of the invention may be adopted for vehicles of a transport system of a central guide rail type (center guide type) in which a guide rail in an extending direction of a track is provided at the central position of the track in its width direction.

In the above-described embodiments, a configuration in which the steering mechanism 15 that steers the tires 13 according to displacement of the steering guide device 14 is provided has been described. However, for example, a configuration in which the steering mechanism 15 is not provided may be adopted like a bogie truck.

Moreover, a configuration in which the vehicular suspension device (suspension device) of the invention is adopted for the vehicle of the track-based transportation system has been described in the above-described embodiments. However, the invention is not limited to this, and it is possible to adopt the vehicular suspension device for various vehicles.

INDUSTRIAL APPLICABILITY

According to the vehicular suspension device, the steering bogie, and the vehicle related to the invention, floor vibration can be reduced as well as the spring stiffness of the running wheels being able to be maintained. Thus, comfortable ride quality can be realized as well as loads imposed to the running wheels being able to be realized.

REFERENCE SIGNS LIST 1, 100, 200, 300: VEHICLE
2: STEERING BOGIE
3: CAR BODY
5: TRACK
6: GUIDE RAIL
11: SUB FRAME (FRAME)
13: TIRE (RUNNING WHEEL)
14: STEERING GUIDE DEVICE
16: SUSPENSION DEVICE (VEHICULAR SUSPENSION DEVICE)
51, 101: PRIMARY SUSPENSION MECHANISM
81: HEIGHT-ADJUSTING DEVICE (AIR SUPPLY AND EXHAUST MECHANISM)

The invention claimed is:

1. A vehicular suspension device comprising:
a pair of primary support parts that respectively and elastically support running wheels having elasticity disposed on both sides in a vehicle width direction on a frame; and
a secondary support part that is disposed between the frame and a car body and integrally and elastically supports the pair of primary support parts and the car body via the frame,
wherein, if a spring stiffness of the running wheels is defined as k1, a spring stiffness of the primary support parts is defined as k2, and a spring stiffness of the secondary support part is defined as k3, k1>k2>k3 is satisfied.

2. The vehicular suspension device according to claim 1, wherein the spring stiffness of the primary support parts is set to ½ or more or ⅔ or less of the spring stiffness of the running wheels.

3. The vehicular suspension device according to claim 1, wherein each of the pair of primary support parts includes a primary suspension mechanism that couples the running wheels and the frame so as to be displaceable in an upward-downward direction, and an elastic member that is arranged between the primary suspension mechanism and the frame.

4. The vehicular suspension device according to claim 1, wherein the secondary support part includes
an air spring that is arranged between the car body and the frame, and
an air supply and exhaust mechanism that performs air supply to and exhausting from the air spring and adjusts the height of the air spring in the upward-downward direction, and
wherein the air supply and exhaust mechanism performs air supply to and exhausting from the air spring on the basis of the total displacement of the primary support parts and the secondary support part in the upward-downward direction with respect to the car body.

5. A steering bogie comprising:
the running wheels;
a steering guide device that is guided by a guide rail extending along a track; and
the vehicular suspension device according to claim 1 that is disposed between the running wheels and the car body.

6. A vehicle comprising:

the car body; and the steering bogie according to claim 5 that is provided in a lower part of the car body.

7. A vehicular suspension device comprising:

a pair of primary support parts that respectively and elastically support running wheels having elasticity disposed on both sides in a vehicle width direction on a frame; and a secondary support part that is disposed between the frame and a car body and integrally and elastically supports the pair of primary support parts and the car body via the frame, wherein a spring stiffness of the primary support parts is set to ½ or more or ⅔ or less of a spring stiffness of the running wheels.

8. The vehicular suspension device according to claim 7, wherein each of the pair of primary support parts includes a primary suspension mechanism that couples the running wheels and the frame so as to be displaceable in an upward-downward direction, and an elastic member that is arranged between the primary suspension mechanism and the frame.

9. The vehicular suspension device according to claim 7, wherein the secondary support part includes an air spring that is arranged between the car body and the frame, and an air supply and exhaust mechanism that performs air supply to and exhausting from the air spring and adjusts the height of the air spring in the upward-downward direction, and wherein the air supply and exhaust mechanism performs air supply to and exhausting from the air spring on the basis of the total displacement of the primary support parts and the secondary support part in the upward-downward direction with respect to the car body.

10. A steering bogie comprising:

the running wheels;

a steering guide device that is guided by a guide rail extending along a track; and the vehicular suspension device according to claim 7 that is disposed between the running wheels and the car body.

11. A vehicle comprising:

the car body; and the steering bogie according to claim 10 that is provided in a lower part of the car body.

\* \* \* \* \*